Dec. 6, 1960
A. KRYNYTZKY
2,963,071
LEVELER FOR SHEET METAL STRIPS
Filed March 15, 1957
4 Sheets-Sheet 1
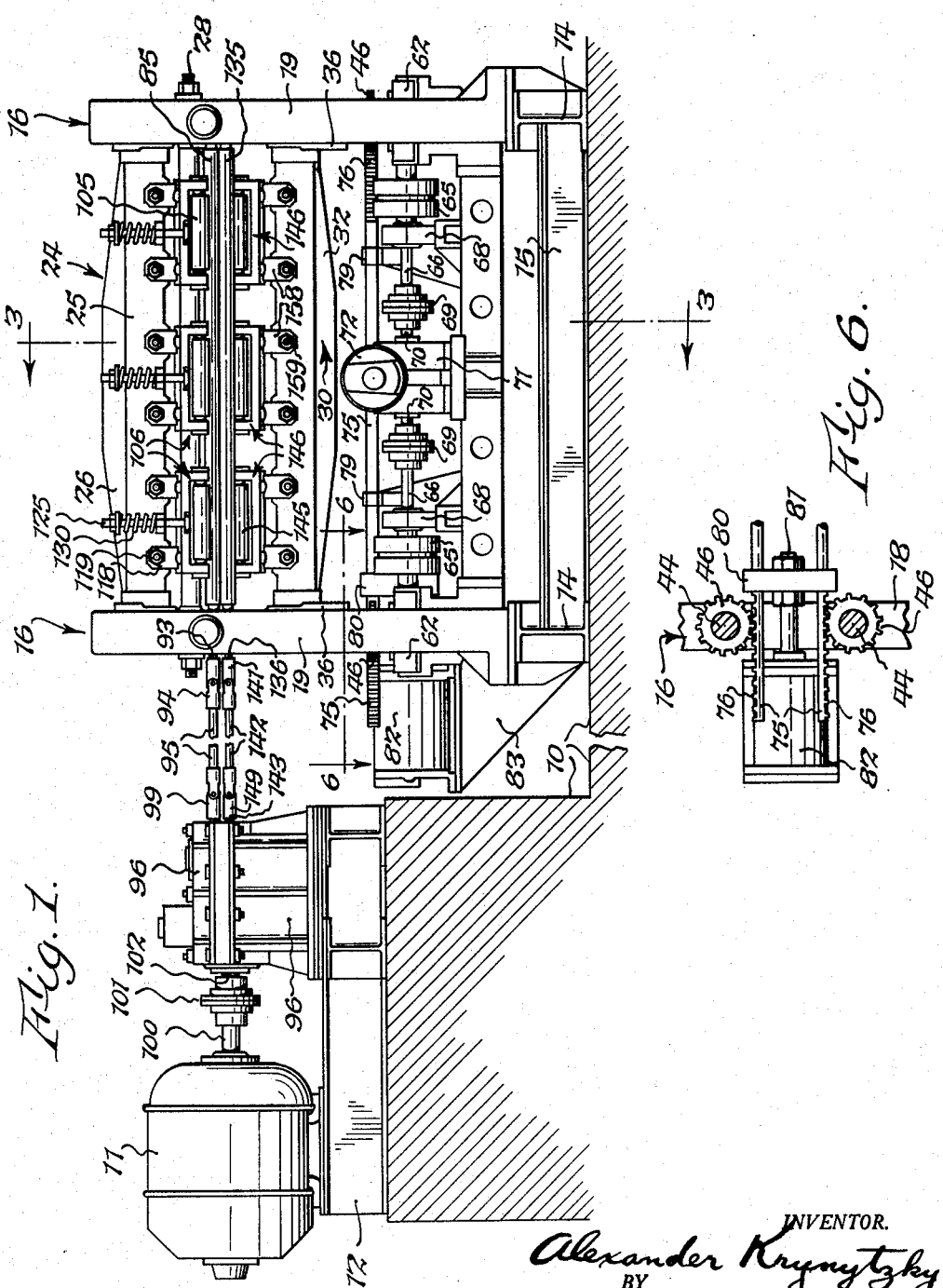
INVENTOR.
Alexander Krynytzky
BY
Popp and Sommer
Attorneys.

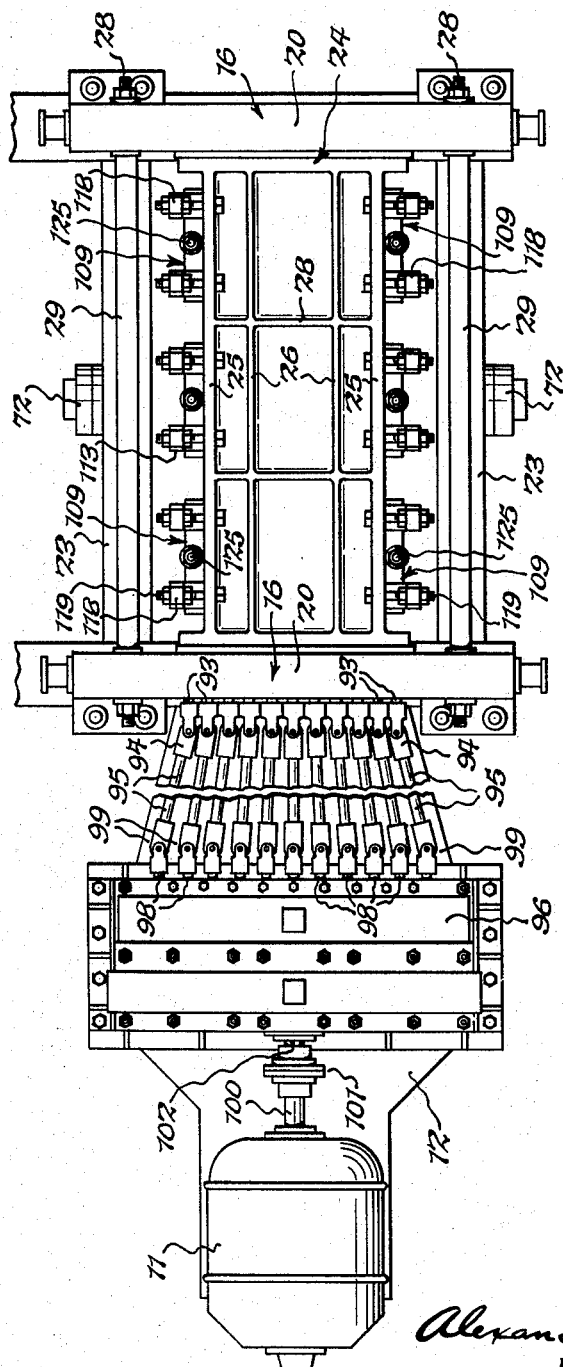

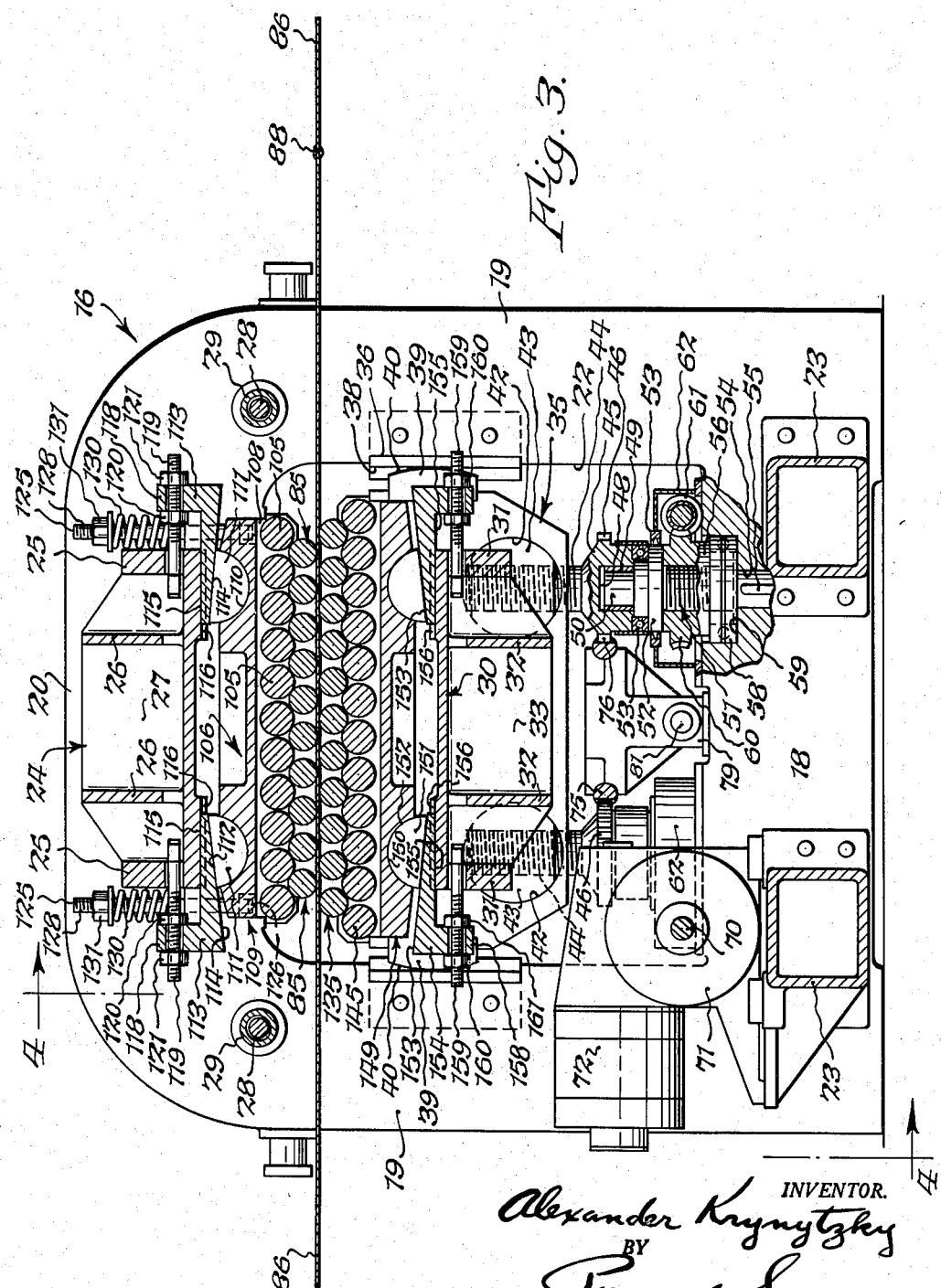

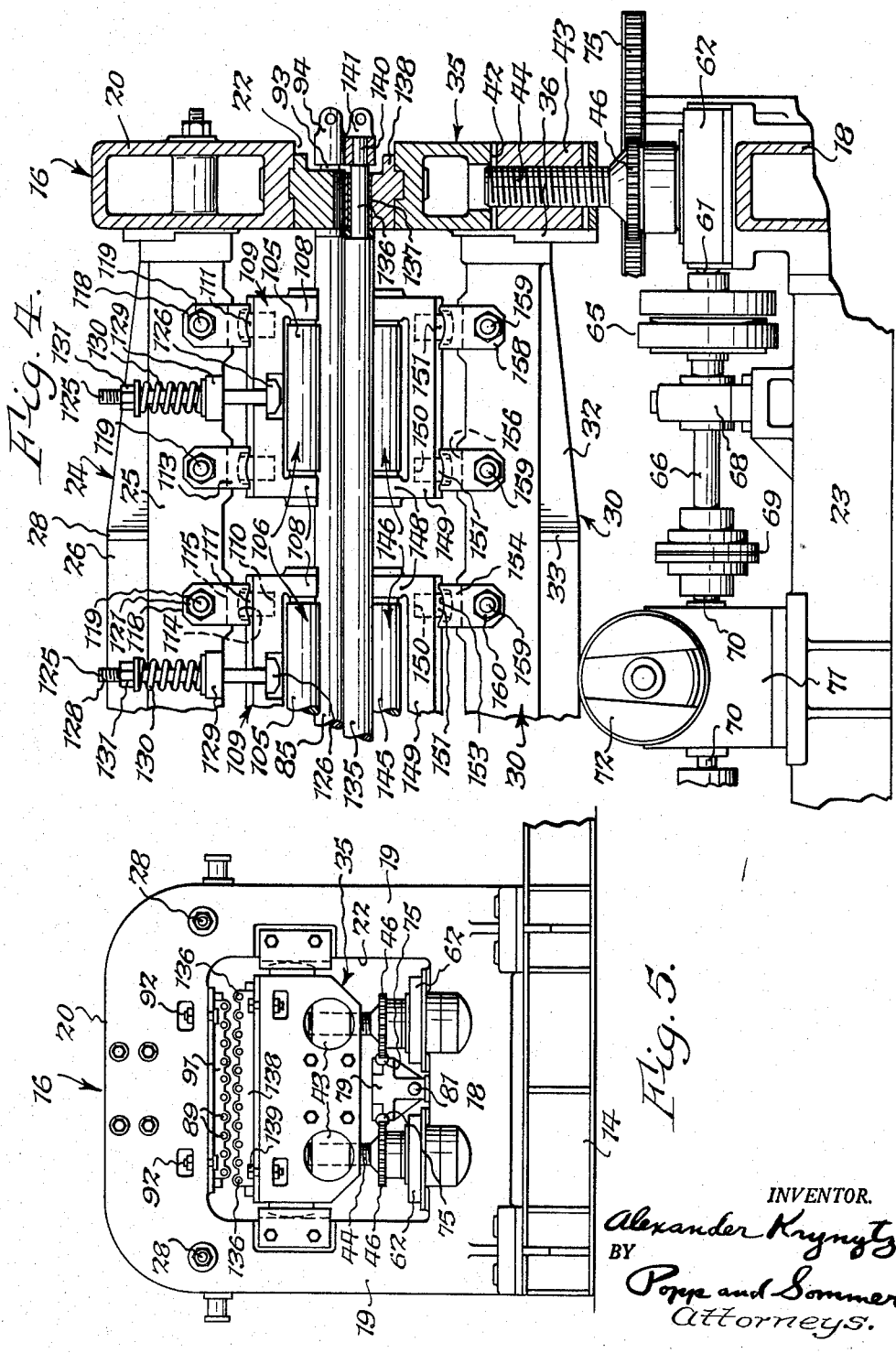

United States Patent Office 2,963,071
Patented Dec. 6, 1960

2,963,071
LEVELER FOR SHEET METAL STRIPS

Alexander Krynytzky, Ebenezer, N.Y., assignor to Lake Erie Machinery Corporation, Buffalo, N.Y., a corporation of New York Filed Mar. 15, 1957, Ser. No. 646,405

4 Claims. (Cl. 153—107)

This invention relates to a leveler for sheet metal strips and more particularly to such a leveler adapted to flatten out and relieve the stresses in a continuous length of a sheet metal strip, the continuous length being provided by welding the trailing end of a sheet metal strip being processed to the leading end of the next succeeding strip.

One of the objects of the invention is to provide such a leveler which will flex the passing strip back and forth a substantial number of times in rapid succession with a very small radius of curvature in the undulations so produced.

Another object of the invention is to provide such a leveler which is differentially adjustable as to its effect in different work areas. Thus, it is not infrequently desirable to treat or flex one side of a strip to a greater degree than the other side thereof and for this purpose, different work areas of the leveler are adjustable to have different effects on the sheet metal strip in process.

Another object is to provide a quick-opening device for rapidly separating and rapidly returning the straightening rolls to their set position without disturbing the setting thereof. The purpose of this is to permit the weld at the ends of the successive metal strips to be passed without injuring the rolls. By opening up the straightening rolls rapidly on the approach of a weld and closing them rapidly, without disturbing their setting, immediately after the weld has passed, not only is the capacity of the leveler increased but also the unprocessed area, that is, the area of the new strip ends adjacent the weld, is reduced to a minimum thereby to reduce the amount of scrap metal. In connection with such quick-opening and quick-closing, known sensing devices can be used to render this operation fully automatic but since such sensing devices form no part of the invention, they are not illustrated.

Another object is to provide wedge adjustments which have curved surfaces in two directions so that these adjusting wedge means conform themselves to the adjusted position of the machine parts which position, as indicated above, may be different in different parts of the working area.

Another object is to provide such a leveler in which conventional practice is followed so far as the mechanical operation of the straightening rolls is concerned, as well as in their drive.

Other objects and advantages of the invention will appear from the following description and drawings in which:

Fig. 1 is a front elevational view of a leveler embodying the present invention, that is, a view from the end to which the sheet metal strips are fed.

Fig. 2 is a top elevational view thereof.

Fig. 3 is an enlarged transverse sectional view taken generally on line 3, 3, Fig. 1.

Fig. 4 is a fragmentary vertical section taken generally on line 4, 4, Fig. 3.

Fig. 5 is an end elevational view viewed from the right hand ends of Figs. 1 and 2.

Fig. 6 is a fragmentary horizontal sectional view taken generally on line 6, 6, Fig. 1.

The leveler is shown as mounted in a pit 10 and driven by an electric motor 11, the structural steel base or bed 12 for which is at floor level. The leveler is also mounted on a structural steel base or bed 13 in the pit 10 and which includes transverse and structural steel I-beams 14 connected by longitudinal beams 15. These transverse I-beams 14 of the base or bed support the end stands 16 of the leveler. These end stands 16 are preferably identical in construction and hence the same reference numerals have been employed for each. Each end stand is shown as having a horizontal base beam 18, corner posts or columns 19 rising from the opposite ends of the base beam 18 and a top horizontal beam 20 connecting the upper ends of the columns 19. The beams and columns 18, 19 and 20 are preferably of box form, as shown in Fig. 4, and jointly define a large generally rectangular opening 22.

The lower parts of the end stands 16 are shown as connected by a pair of spaced horizontal base beams 23 which can also be of box form in cross section as shown in Fig. 3. The upper part of the end stands 16 are shown as connected by a stationary top plate 24 which is shown as having longitudinal side beams 25, upstanding central longitudinal reinforcing ribs 26 and upstanding transverse ribs 27 so that this stationary top plate will withstand a considerable upward pressure. Horizontal rods 28 surrounded by tubular spacers 29 are shown as holding the upper ends of the end stands 16 together.

A bottom plate 30 is mounted for vertical movement below the top plate 24, the ends of this bottom plate being arranged between and guided by the corner columns 19 of the leveler frame. This bottom plate is shown as having depending side beams 31, depending central longitudinal reinforcing ribs 32 and depending cross ribs 33. To the opposite ends of this bottom plate 30 are secured end heads 35 and which are arranged in the openings 22 in the end stands and are guided for vertical movement by the frame columns 19. To so guide the end heads 35, a guide bracket 36 is removably attached to each column 19 and each guide bracket 36 is formed to provide a vertical guideway 38 in which a guide block 39 fast to the corresponding end head 35 rides. The operative face 40 of each guide block 39 is preferably rounding or cylindroidal about a horizontal axis extending lengthwise of the bottom plate 30 so that the bottom plate can be tilted in any direction to a limited degree.

Means are provided at each corner of the bottom plate 30 for adjusting the elevation thereof and which include a quick release and return of the top plate to its adjusted position. For this purpose, each end head 35 is provided at each end with a horizontal cylindrical bore 42 in which is fitted a cylindrical nut 43. An upright screw 44 mates with each nut and extends diametrically therethrough. Each screw 44 has an enlarged head 45 at its lower end the periphery of which is formed to provide a pinion 46. The enlarged head 45 is also provided with a bore 48 extending upwardly from its lower end and which contains a bearing bushing 49 for a stem 50 at the upper end of a vertical screw 51. Below the stem 50 the screw 51 is provided with an enlarged, disk-like head 52 supporting a thrust bearing 53 which supports the head 45 of the screw 44. To prevent the screw 51 from turning but to permit it to move vertically the lower end of its shank is unthreaded and fitted in a bore 54 in which it is prevented from turning by a spline 55. Each screw 51 is supported by a circular nut 56 supported by a thrust bearing 58, the latter being contained in a cylindrical recess 59 at the upper end of the bore 54.

The periphery of the nut 56 is formed to provide a worm gear 60 which mates with a horizontal worm 61. The worm and worm wheel are shown as contained in a housing 62 which fits a wear ring or seal 63 on the screw head 52.

Each worm 61 is journalled in any suitable manner and is driven through a magnetic clutch 65 from a shaft 66 journalled in a bearing 68 and connected by a coupling 69 with one of a pair of output shafts 70 from the reduction gear box 71 of an electric motor 72 mounted on the base beams 23 of the frame. Two motors 72 are provided, one on each of the base beams 23, each of its two output shafts 70 projecting toward and serving the worm and worm wheel drive 61, 60.

Means are provided for quickly lowering the lower movable plate 30 and quickly returning it to the same position without alteration of its adjusted position. Such quick dropping and return is effected when the weld at the end of a sheet is encountered.

For this purpose, a pair of parallel, horizontally extending spaced rack bars 75 are provided near the center of the machine below the bottom plate parallel with the shafts 66 for driving the worm gears. These rack bars are shown as being round in cross section and each end of each bar is provided with a series of rack teeth 76 engaging the teeth of a corresponding gear 46. The rack bars 75 are slidingly supported for longitudinal movement in slideways 78 provided in a pair of supporting blocks 79 which are mounted on the frame of the machine.

Near one extremity of the machines, the rack bars 75 are connected to each other by a cross head 80 which in turn is connected to one end of a piston rod 81 from a piston within a horizontal cylinder 82. The cylinder 82 is shown as mounted on a bracket 83 secured to the base of the frame.

The vertically stationary upper plate 24 supports a bank of rolls 85 which are arranged in closely spaced relation to each other in line with the openings 22 in the end stands 16 and are arranged with their axes in a common horizontal plane. These upper straightening rolls 85 engage the upper side of the strip 86 of sheet metal to be straightened and the numeral 88 represents a weld connecting the ends of two of such strips. To accommodate strips 86 of sheet metal of maximum width, the upper bank of straightening rolls 85 have their cylindrical working surfaces extending substantially the full distance between the end stands 16 and have reduced ends 89 journalled in bearings provided in a bearing block 91, each secured, as by T bolts 92, to the under surface of the corresponding upper cross beam 20 of the frame 16. One extremity 93 of each of the upper bank of straightening rolls 85 is connected by a universal joint 94 to a drive shaft 95. The drive shafts 95 are arranged in a common horizontal plane and diverge toward a gear box 96 having a plurality of horizontally alined output shafts 98, each of which is connected to a corresponding universal joint 99. The gear box 96 is mounted on the bed 12 and this gear box and the shafts 95 are conventional, these shafts all being driven in the same direction by the gearing (not shown) within the gear box 96 and this gearing being driven by the electric drive motor 11 which has its output shaft 100 connected by a coupling 101 with the input shaft 102 of the gear box 96. By this drive, the upper bank of straightening rolls 85 are all rotated in the same direction, this being shown as being clockwise as viewed in Fig. 3, so as to move the strips 86 of sheet metal to the left as viewed in this figure.

Each straightening roll 85 of the upper bank is backed by six backing rolls 105 which are provided in three groups 106, one group engaging the upper bank of straightening rolls 85 at their centers, and each of the other groups engaging the opposite ends of these straightening rolls as best shown in Figs. 1 and 3. Each of the backing rolls 105 is short as compared with the straightening rolls 85 and has its opposite end journalled in end walls 108 of an inverted U-shaped holder 109 for these backing rolls. Each inverted U-shaped holder 109, as best shown in Fig. 3, has a semi-circular recess 110 at each end of its upper face, the axis of which extends parallel with the axes of the backing rolls 105 and each of which contains a semi-cylindrical block 111 which rockably fits the recess 110 and which has a rounding upper face 112 engaging the rounding under surface 114 of a wedge 113. The axis of the rounding upper face 112 of each semi-cylindrical block 111 is perpendicular to the axis of the semi-cylindrical recess 110. The flat upper face 115 of each wedge 113 rides in a horizontal guideway 116 in the top plate 24 and each wedge has an upstanding lug 118 at its outer end through which a stud screw 119 extends, the inner end of each T screw 119 being suitably anchored in the corresponding side flange 25 of the top plate 24, as best shown in Fig. 3. Each T screw 119 is provided with a pair of nuts 120, 121 through the adjustment of which the corresponding wedge 113 can be moved in or out to wedge up or relieve the corresponding end of the group 106 of upper backing rolls 105.

Each end of each U-shaped holder 109 for the upper groups of backing rolls 105 is biased upwardly so as to hold the cylindroidal blocks 111 against the wedges 113 independently of any upward pressure exerted by the upper bank of straightening rolls 85. For this purpose, a bolt 125 has its head 126 engaging the underside of each end of each U-shaped holder 109 and has its shank 128 projecting upwardly through an apertured lug 129 projecting horizontally from the stationary top plate 24. A helical compression spring 130 surrounds each shank 128 and is held in compressive relation with the upper side of its lug 125 by a nut 131 on the upper end of the bolt shank 128.

The under surface of the sheet metal strips 86 being processed are engaged by a lower bank of straightening rolls 135, the upper and lower straightening rolls 85, 135 being in staggered or alternate relation to one another so that the sheet metal strips 86 being straightened are flexed sinusoidally or rippled back and forth as they successively pass between the two banks of straightening rolls. The straightening rolls 135 of the lower bank have their cylindrical working surfaces extending substantially the full distance between the end stands 16 and the opposite ends 136 of these straightening rolls 135 of the lower bank are journalled by bearings 137 in bearing blocks 138, each of these bearing blocks being secured, as by bolts 139, to the upper side of the corresponding end head 35 of the corresponding lower movable plate 30. One extremity 140 of each straightening roll 135 of the lower bank is connected by a universal joint 141 to a drive shaft 142. The drive shafts 142 are arranged in a common horizontal plane and diverge toward the gear box 96 which has a plurality of horizontally alined output shafts 143 to which each shaft 142 is connected by a corresponding universal joint 149. The lower bank of straightening rolls 135 are all rotated in the same direction, this being counterclockwise as viewed in Fig. 3, so as to move the strips 86 of sheet metal to the left as viewed in this figure.

Each straightening roll 135 of the lower bank is supported by six backing rolls 145 which are provided in three groups 146, one group supporting the lower bank of straightening rolls 135 at their centers and each of the other groups supporting the opposite ends of these straightening rolls, as best shown in Figs. 1 and 3. Each of the backing rolls 145 is short as compared with the straightening rolls 135 and has its opposite end journalled in end walls 148 of a U-shaped holder 149 for these backing rolls. Each U-shaped holder 149, as best shown in Fig. 3, has a semi-circular recess 150 at each end of its under face, the axis of which extends parallel with the axes of the backing rolls 145 and each of which contains a semi-cylindrical block 151 which rockably fits the recess 150 and which has a rounding under face 152 engaging the upper surface 153 of a wedge 154. The axis of the rounding under face 152 of each semi-cylindrical block 151 is perpendicular to the axis of the semi-cylindrical recess 150. The flat under face 155 of each wedge 154 rides in a horizontal guideway 156 in the bottom plate 30 and each wedge has a depending lug 158 at its outer end through which a T bolt 159 extends, the inner end of each T bolt 159 being suitably anchored in the corresponding side beam 31 of the bottom plate 30, as best shown in Fig. 3. Each T bolt 159 is provided with a pair of nuts 160, 161, through the adjustment of which the corresponding wedge can be moved in or out to wedge up or relieve the corresponding end of the group 146 of the upper backing rolls 145.

Operation

In the operation of the leveler, a continuous series of strips 86 are fed between the upper and lower banks of straightening rolls 85 and 135, respectively, the trailing end of one strip being welded, as indicated at 88, to the leading end of the next succeeding strip so that the successive strips are processed as a single continuous strip. However, it is important that the upper and lower bank of forming rolls 85, 135 be retracted from each other when the weld 88 is passing through the machine since otherwise the weld would injure the straightening rolls. The straightening rolls 85 and 135 of the upper and lower banks are arranged in offset relation to each other so that each straightening roll 85 of the top roll presses against a strip of metal between the straightening rolls 135 of the lower bank. As a consequence, the metal of the strip is flexed back and forth sinusoidally in a series of waves or ripples as the strips 86 pass between the banks of the straightening rolls in consequence of which all stresses existing in the sheet are relieved by this mechanical working of the sheet in bending it back and forth. It is desirable that the straightening rolls 85, 135 be of minimum diameter to provide the required working in a run of minimum length and it is also desirable that the straightening rolls 85 and 135 be independently adjustable at opposite ends since at times it is desirable to flex or work one side of the strip to a greater extent than the opposite side. It is also desirable to be able to effect such an adjustment rapidly. It is also desirable to be able to rapidly separate the upper and lower banks of rolls 85, 135, when a weld 88 approaches the machine and thereafter to bring the straightening rolls back to their original setting for continued work upon the strip beyond the weld.

When it is desired to effect a greater degree of working between the straightening rolls 85, 135 at either side of the machine or at any corner thereof, the operator energizes the corresponding electromagnetic clutch 65. Accordingly, motion is transmitted from the corresponding shaft 66, driven by one of the motors 72, to the corresponding horizontal worm 61. This rotates the corresponding worm wheel 60 which forms the periphery of the nut 58 and hence causes this nut to lift the screw 51, this screw being held against turning by the spline 55. Raising the head 52 of the screw 51, through the thrust bearing 53, raises the head 45 of the screw 44 and also raises the cylindrical nut 43 at the upper end of the screw 44. This lifts the corresponding extremity of the corresponding end head 35. This raises the corresponding corner of the lower plate 30 of which these end heads form a part and hence raises one end of the corresponding group 146 of lower backing rolls 145. This forces upwardly the companion ends of the corresponding straightening rolls 135 of the lower bank thereby to bring these ends of these lower forming rolls 135 into closer relation to the corresponding ends of the upper forming rolls 85. As a result, more work is performed on the strip 86 of sheet metal passing through that corner of the machine. It will accordingly be seen that the degree of pressure exerted by the two banks of straightening rolls 85, 135 against the strip 86 being processed can rapidly be adjusted independently at any corner of the group of rolls to suit changes in the characteristics of the sheet metal strips 86 as they pass through the machine. It will be seen that such independent adjustment of each corner of the lower bank of straightening rolls 135 is permitted by the rounding face 40 of the corresponding block 39 which permits this corner of the bottom plate 30 to be raised independently of the other corner without binding against the guideway 38 for this corner of the bottom plate.

When a weld 88 approaches the machine it is important that the banks of straightening rolls 85, 135, be separated to permit the passage of this weld without injury to the straightening rolls. Following passage of the weld, it is desirable that these straightening rolls be returned to their original set relation. It is obviously desirable that this be done with maximum rapidity so as to reduce to a minimum the length of the strips 86 which are not worked because of the presence of the weld 88.

To this end, as the weld 88 approaches the machine, hydraulic fluid is introduced into the cylinder 82 to drive its piston rod 81 outwardly. This can be done by the operator, but for maximum rapidity is more desirably initiated by a mechanical sensing device (not shown) such as a feeler or an electromagnetic, electrostatic or photocell detector, which senses the approach of the weld 88 and admits the hydraulic fluid to the cylinder 82 for such length of time as to permit the weld to pass through the machine. The outward movement of the piston rod 81, through the cross bar 80, Fig. 6, moves the rack bars 75 longitudinally. This reciprocates each rack 76 thereby to turn the corresponding pinion 46, all of these pinions 46 being turned in unison. Since the pinions 46 are integral with the heads 45 of the screws 44, these screws 44 are turned, the turning being in the direction to lower the cylindrical nuts 43 at the upper ends of these screws. This lowers the two end heads 35 for the bottom plate 30 and since the lower bank of straightening rolls 135 are journalled in bearing blocks 138 on these end heads 35, this withdraws the lower bank of straightening rolls 135 from the upper bank of straightening rolls 85 so that the weld 88 can pass between these two banks of rolls without injury. After the time interval required for the passage of the weld 88 through the machine has elapsed, the hydraulic pressure in the hydraulic cylinder 82 can be reversed, thereby to reverse the longitudinal movement of the rack bars 75 whereby the racks 76 turn the pinions 46 so as to reverse the rotation of the screws 44 and through the nuts 43 to lift the end heads 35 of the bottom plate 30 to their original setting for continued operation upon the strips 86 of metal.

In initially setting up the machine, either end of any of the groups 106 or 146 of the upper and lower banks of backing rolls 105 and 145, respectively, can be adjusted to exert a greater or less degree of pressure upon the corresponding parts of the corresponding straightening rolls 85, 135. By providing the backing rolls 105 for the upper straightening rolls 85 in three groups 106 acting, respectively, against the centers and opposite ends of these straightening rolls, and by providing the holder 109 for each of these groups of these backing rolls, it will be seen that a very fine adjustment of the effect of these backing rolls against any part of the upper bank of straightening rolls 85 can be effected by adjusting the wedges 113, Fig. 3. Thus a wedge 113 is provided at each of the four corners of each holder 109 for each of the three groups 106 of upper backing rolls 105. Accordingly, by adjustment of the nuts 120, 121 any one of these wedges 113 can be moved in to force down the corresponding corner of the companion holder 109 for the corresponding group of upper backing rolls 105. Similarly, any of these wedges can be withdrawn by adjustment of the nuts 120, 121 whereupon the corresponding springs 130 will elevate that corner of the holder 109 and relieve the pressure of the corresponding ends of the corresponding upper backing rolls 105.

Since the backing rolls 145 for the lower straightening rolls 135 are provided in three groups at the center and ends of the straightening rolls 135, respectively, and since each group is journalled in its own holder 149 and an adjusting wedge 154 provided at each corner of each of these holders, it will be seen that a similar fine adjustment can be made so that the upper and lower banks of straightening rolls 85, 135, can be adjusted to have uniform action upon the strip 86 in relieving it of all stresses throughout the course of the strip through the machine. At the same time, as above indicated, the machine can be rapidly adjusted, through the electromagnetic clutches 65, to exert a great or less degree of work on either side of the strip so that the effectiveness of the machine can be rapidly adjusted to correspond to variations in the strips being processed, some of which may be slightly thicker at one side than the other.

It will also be seen that when a weld is encountered, the straightening rolls 85, 135 can be rapidly separated from each other and, following the passage of the weld, rapidly return so as to avoid danger of injury to the machine by the weld and at the same time reduce the unworked portions of the strips 86 to a minimum.

I claim:

1. A leveler for sheet metal strips, comprising a stationary frame structure, a bank of straightening rolls journalled in said frame structure and arranged in a generally horizontal plane, a straightening roll holder structure mounted in said frame structure below said bank of straightening rolls for vertical movement relative thereto, a second bank of straightening rolls journalled on said holder structure and arranged in a generally horizontal plane in parallel alternate relation with the straightening rolls of the other bank and said banks of rolls being closely spaced to flex a strip of metal sinusoidally traveling therebetween back and forth to relieve internal stresses in the strip, a pair of coaxial vertical screw shafts arranged under each corner of said holder structure, a thrust bearing interposed between the opposing ends of said screw shafts at each corner of said holder structure, a first nut on one of said screw shafts and operatively connected to one of said structures, a second nut on the other of said screw shafts and operatively connected to the other of said structures, a first motor, means simultaneously turning all of said one of said screw shafts through power derived from said first motor, at least one additional motor, and means selectively coupling said additional motor with one of said second nuts at each corner of said holder structure.

2. A leveler for sheet metal strips, comprising a stationary frame, a bank of straightening rolls journalled in said frame and arranged in a generally horizontal plane, a straightening roll holder mounted in said frame below said bank of straightening rolls for vertical movement relative thereto, a second bank of straightening rolls journalled on said holder and arranged in a generally horizontal plane in parallel alternate relation with the straightening rolls of the other bank and said banks of rolls being closely spaced to flex a strip of metal traveling therebetween back and forth sinusoidally to relieve internal stresses in the strip, a nut journalled on said frame under each corner of said holder to rotate about a vertical axis, a vertical screw shaft threadedly supported by each nut, means preventing said screw shaft from turning, a second vertical screw shaft journalled on the upper end of said first mentioned screw shaft to rotate coaxially relative thereto, a nut threadedly supported on each second screw shaft and connected with the corresponding corner of the holder, power means arranged to turn said first mentioned nuts, and a second power means arranged to turn said second vertical screw shafts.

3. A leveler for sheet metal strips, comprising a stationary frame, a bank of straightening rolls journalled in said frame and arranged in a generally horizontal plane, a straightening roll holder mounted in said frame below said bank of straightening rolls for vertical movement relative thereto, a second bank of straightening rolls journalled on said holder and arranged in a generally horizontal plane in parallel alternate relation with the straightening rolls of the other bank and said banks of rolls being closely spaced to flex a strip of metal traveling therebetween back and forth sinusoidally to relieve internal stresses in the strip, a nut journalled on said frame under each corner of said holder to rotate about a vertical axis, a vertical screw shaft threadedly supported by each nut, means preventng said screw shaft from turning, a second vertical screw shaft journalled on the upper end of said first mentioned screw shaft to rotate coaxially relative thereto, a nut threadedly supported on each second screw shaft and connected with the corresponding corner of the holder, at least one motor, means selectively coupling said motor with any of said first mentioned nuts, and power means arranged to simultaneously turn said second vertical screw shafts in unison.

4. A leveler as set forth in claim 3 wherein said selectively operated coupling means includes a magnetic clutch associated with each of said first mentioned nuts.

References Cited in the file of this patent

UNITED STATES PATENTS

| 2,091,789 | Maussnest | Aug. 31, 1937 |
| 2,254,461 | Todd | Sept. 2, 1941 |
| 2,365,114 | Shields | Dec. 12, 1944 |
| 2,429,142 | Thomas | Oct. 14, 1947 |
| 2,638,143 | Maust | May 12, 1953 |

FOREIGN PATENTS

| 268,977 | Germany | Jan. 9, 1914 |